United States Patent [19]

Nagasawa et al.

[11] Patent Number: 5,241,250
[45] Date of Patent: Aug. 31, 1993

[54] SERVOMOTOR CONTROL SYSTEM FOR MULTI-AXES

[75] Inventors: Toshiaki Nagasawa; Koichiro Chaen; Makoto Suzuki; Shigeo Kobayashi; Minoru Kobayashi; Hidenori Koga, all of Sayama, Japan

[73] Assignee: Honda Giken Kogyo Kabushiki Kaisha, Tokyo, Japan

[21] Appl. No.: 888,504

[22] Filed: May 27, 1992

[30] Foreign Application Priority Data

May 27, 1991 [JP] Japan .................................. 3-121470
Jun. 6, 1991 [JP] Japan .................................. 3-135107

[51] Int. Cl.$^5$ .............................................. G05B 19/19
[52] U.S. Cl. ................................. 318/591; 318/568.2; 318/573; 318/53
[58] Field of Search .................... 318/560–573, 318/696, 34–80; 901/3, 5, 7, 9, 12, 13, 15–23; 395/82, 83, 84

[56] References Cited

U.S. PATENT DOCUMENTS

| | | | |
|---|---|---|---|
| 4,420,812 | 12/1983 | Ito et al. ............................... | 318/573 |
| 4,445,184 | 4/1984 | Noguchi ............................... | 318/568 |
| 4,473,785 | 9/1984 | Kurakake ............................. | 318/560 |
| 4,497,028 | 1/1985 | Nozawa et al. ...................... | 318/53 |
| 4,625,285 | 11/1986 | Mori et al. .......................... | 318/568 |
| 4,633,414 | 12/1986 | Yabe et al. .......................... | 318/568 |
| 4,689,756 | 8/1987 | Koyama et al. .............. | 318/573 X |
| 4,698,777 | 10/1987 | Toyoda et al. ...................... | 318/573 |
| 4,825,133 | 4/1989 | Tanuma et al. ..................... | 318/696 |
| 4,878,002 | 10/1989 | Heatzig et al. . | |
| 4,888,534 | 12/1989 | Kuchiki ............................... | 318/567 |
| 4,914,364 | 4/1990 | Hirai .................................... | 318/590 |
| 4,956,785 | 9/1990 | Kawamura et al. ........... | 364/474.01 |
| 4,985,668 | 1/1991 | Nakazumi et al. ............... | 318/568.2 |
| 5,010,285 | 4/1991 | Kawamura et al. .............. | 318/569 |
| 5,025,393 | 6/1991 | Naito .................................. | 364/513 |
| 5,032,975 | 7/1991 | Yamamoto et al. ................ | 364/134 |
| 5,038,089 | 8/1991 | Szakaly ........................... | 318/568.11 |
| 5,047,700 | 9/1991 | Szakaly ............................. | 318/568.1 |
| 5,053,972 | 10/1991 | Kurakake et al. .............. | 364/474.12 |
| 5,084,660 | 1/1992 | Sasaki et al. ......................... | 318/569 |

FOREIGN PATENT DOCUMENTS 63-165907 7/1988 Japan .

OTHER PUBLICATIONS

"A Software-Way of Non-Interacting Cu-rent Control for a Brushless Servomotor on a DSP" and english translation, T.IEEE, vol. 107-D, No. 2, 1987, Matsui et al. pp. 215-222

"Actualizing an Intelligent Servo by Using a DSP" and English translation, Motortech Japan '90, Se-sion B-2, Mar./1990, B-2-2-1 — B-2-2-12.

Primary Examiner—Paul Ip

[57] ABSTRACT

A servomotor control system for multi-axes in which a single servo-amplifier can operate m rotational speed control loops and m current control loops as well for m servomotors simultaneously, where m is a predetermined integer greater than unity, while a single positioning controller with a signal teaching box can handle n servo-amplifiers in parallel, where n is a predetermined integer greater than unity, thereby mn servomotors in total can be controlled by a single system. In the system of the invention, the multiple servomotors can be divided into groups each including up to six servomotors to be controlled as a group and independently from servomotors belonging to other groups. The system of the invention can easily be expanded by a minimum addition of servo-amplifiers and/or positioning controllers to include servomotors more than mn, in which addition of one or more teaching boxes is possible whenever they become necessary.

10 Claims, 12 Drawing Sheets

SERVOMOTOR CONTROL SYSTEM FOR MULTI-AXES

BACKGROUND OF THE INVENTION

1. Field of the Invention

The present invention relates to a control system for AC servomotors used for robots and so on, and more particularly relates to a servomotor control system for multi-axes capable of controlling up to mxn servomotors, where m and n are predetermined integers, under the control of a single teaching box by using n servo-amplifiers each capable of operating m speed control loops and m current control loops as well for m AC servomotors simultaneously, which is readily expandable to include servomotors more than mxn by addition of the least system components.

2. Description of the Related Art

Recently, in industries, robots for welding, fabrication and other variety of applications are used. In these industrial robots, many AC servomotors are used because of their high reliability, low maintenance and wide ranging speed controllability.

Digital servo-amplifiers for controlling AC servomotors according to a "Vector control theory" implemented on a "Digital Signal Processor" (DSP) are becoming popular (see, for instance, "A software-way of non-interacting current control for a brushless servomotor on a DSP" by Matsui, et al. Trans. Inst. Electr. Eng.s of Japan, vol. 107-D No. 2, 1987). There is also seen an example of a servo-amplifier using a DSP which handles 3 current control loops for 3 servomotors simultaneously, in a paper "Actualizing an intelligent servo by using a DSP" authored by Nobuyuki Matsui, presented at the "Technical Symposium on Small-sized Motors" held in Tokyo, Japan on Mar. 1, 1990.

There has been disclosed a technical concept of controlling 3 current control loops simultaneously for 3 servomotors. However, the inventors believe that no system employing a single DSP has yet been disclosed which employs which operates 3 speed control loops and 3 current control loops to simultaneously control 3 servomotors.

On the other hand, even if it would be possible to control 3 servomotors by a single servo-amplifier, when one more servomotor is to be added, it is conventionally necessary to add one more teaching box, one more positioning controller and one more servo-amplifier. This causes complexity of the system configuration, increased costs, intricacy of the teaching procedure and thus a heavier burden on the operator.

SUMMARY OF THE INVENTION

One of objects of the invention is, taking into account the above-mentioned problems, to provide a servomotor control system for multi-axes in which a single servo-amplifier can operate simultaneously m rotational speed control loops and m current control loops as well for m servomotors, where m is a predetermined integer greater than unity, while a single positioning controller with a single teaching box can handle n servo-amplifiers in parallel, where n is a predetermined integer greater than unity, thereby mxn servomotors in total can be controlled by a single system.

Another object of the invention is to provide a servomotor control system for multi-axes in which multiple servomotors can be divided into groups each including up to six servomotors to be controlled as a group and independently from servomotors belonging to other groups.

Still another object of the invention is to provide a servomotor control system for multi-axes which can easily be expanded by a minimum addition of servo-amplifiers and/or positioning controllers to include servomotors of more than mxn, in which addition of one or more teaching boxes is possible whenever they become necessary.

In order to attain the above-mentioned objects and others, the servomotor control system for multi-axes of the invention comprises: at least one servo-controller which operates m speed control loops for m AC servomotors, each of the speed control loops including a current control loop, where m is a predetermined integer greater than unity; at least one positioning controller which divides the servomotors into groups, each group including servomotors of an optional number between 1 and 6, each position operating controller a rotational position control loop under acceleation-deceleration control for each of said servomotors, with interrelationship between each servomotor in each group and independently of servomotors belonging to other groups, the rotational position control loop including a corresponding speed control loop and providing a rotational speed instruction value for the speed control loop; at least one bus for connecting the servo-controller with the positioning controller; at least one teaching box for teaching the system operating conditions for each group and each servomotor; and a communication network for connecting the teaching box with a positioning controller, wherein a servo-controller can be added when the number of servomotors included in the system exceeds an integer times m, and assuming n is a predetermined integer greater than unity, a positioning controller and a bus can be added when the number of the servo-controllers exceeds an integer times n.

In the system of the invention, the servo-controller can include: position detecting circuits for detecting respective rotational positions of axes of the m servomotors; current detecting circuits for detecting respective driving currents supplied by the servo-controller to the m servomotors; a servo-amplifier for calculating respective rotational speeds of axes of the m servomotors based on the respective rotational positions, for executing speed control operations to control the respective rotational speeds of axes of the m servomotors based on respective rotational speed instruction values supplied by the positioning controller, and for executing current control operations to control the respective driving currents to the m servomotors based on respective driving current instruction values produced in the speed control operations for the m servomotors; driving current generating circuits for generating m three phase currents as the respective driving currents to be supplied to the m servomotors based on corresponding driving signals outputted by the servo-amplifier for the m servomotors.

In the system of the invention, the servo-amplifier can include a digital signal processor (DSP).

In the system of the invention, the servo-amplifier executes each of said speed control operations for each of said m servomotors after executing the current control operations for the m servomotors, and when the speed control operations are executed for m servomotors, one processing cycle in the servo-amplifier is completed.

In the system of the invention, the current detecting circuits can include: m pairs of current sensors for detecting 2 out of 3 phases of the respective driving currents for the m servomotors; a multiplexer for selecting 1 out of m pairs of current sensors; and a pair of analog-to-digital converters for converting a pair of analog signals provided by the multiplexer into corresponding digital signals.

In the system of the invention, the driving current generating circuits can include: m pulse width modulation (RWM) units for converting the respective driving signals outputted by the servo-amplifier for the m servomotors into corresponding pulse-width modulated signals; and m inverters for generating m three phase currents based on the corresponding pulse-width modulated signals.

In the system of the invention, the positioning controller can include: unit control program block for controlling groups of servomotors, each group including servomotors of an optional number between 1 and 6, the block providing an acceleration-deceleration time, a constant-speed time, a displacement in the acceleration-deceleration time and a displacement in the constant-speed time for each servomotor of the group so that all servomotors of the group arrive at a target position at the same time.

In the system of the invention, the positioning controller can further include a position control program block for controlling rotational positions of axes of the respective servmomotors to coincide with the target positions supplied by the unit control program block.

In the system of the invention, the positioning controller can further include connection program block for connecting the unit control program block with the position control program block.

BRIEF DESCRIPTION OF THE DRAWINGS

The invention is further illustrated by the accompanying drawings, in which.

DESCRIPTION OF PREFERRED EMBODIMENT

A servomotor control system for multi-axes according to the teachings of the invention, capable of controlling mn servomotors, will be explained with reference to accompanying drawings.

Figure 1:
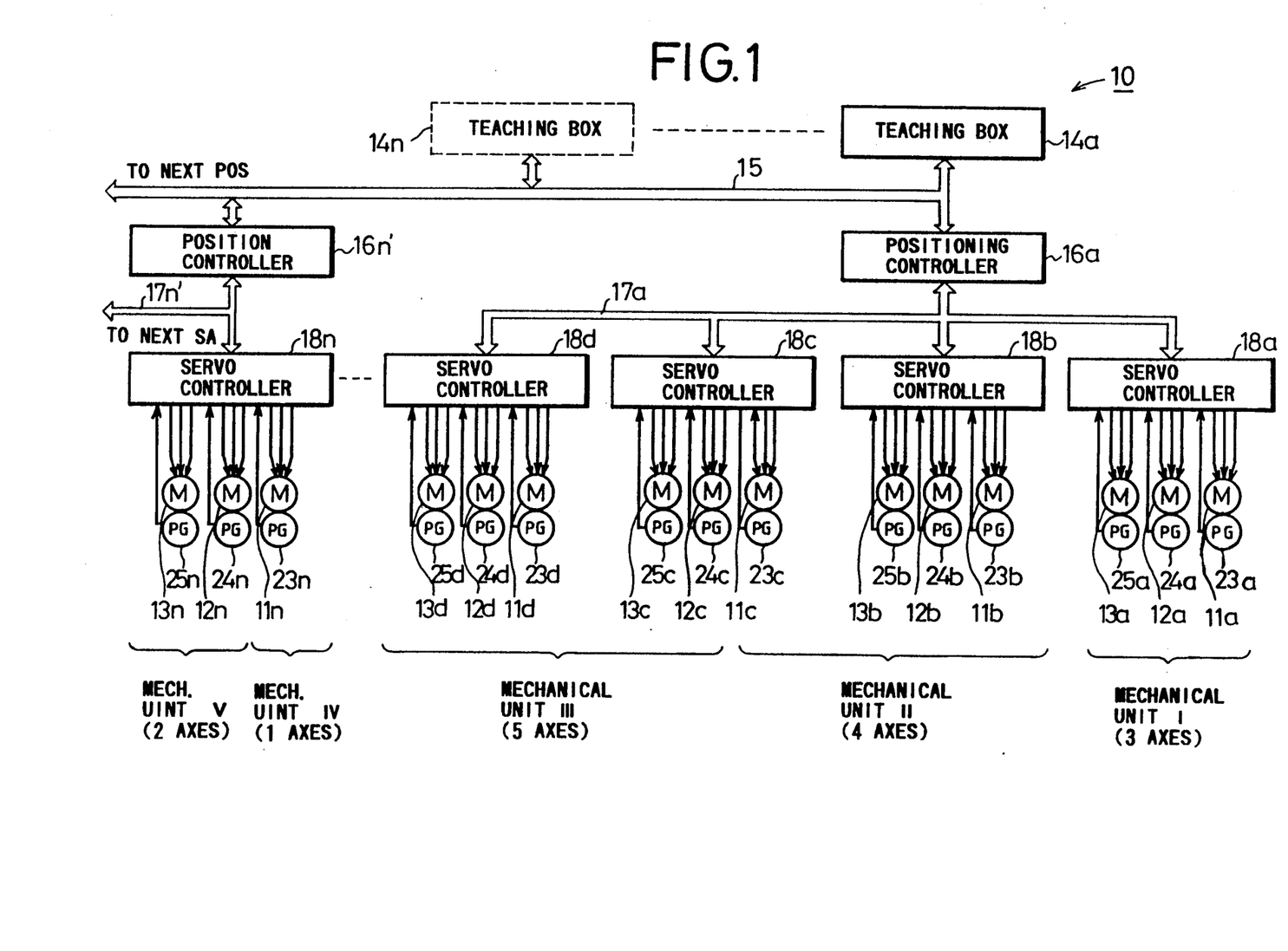
FIG. 1 is a block diagram showing an entire construction of the servomotor control system for multi-axes as an embodiment of the invention.

FIG. 1 is a block diagram showing an entire construction of the servomotor control system 10 for multi-axes as an embodiment of the invention, wherein m ($>$1) is the number of servomotors to be controlled by a single servo-controller and n ($>$1) is the number of the servo-controllers included in the system. In FIG. 1, a case where m=3 and n=4 (n=5 after addition of components) is shown.

The servomotor control system 10 for multi-axes, comprises: servo-controllers 18a, 18b, 18c and 18d for digitally controlling servomotors: 11a, 12a, 13a; 1b, 12b, 13b; 11c, 12c, 13c; and 11d, 12d, 13d, respectively; a positioning controller 16a for dividing the servomotors 11a to 13d into groups each named a "mechanical unit" and including up to six servomotors to be controlled as a group and independently from servomotors belonging to other mechanical units, for controlling a rotational position of axis of each of the servomotors 11a to 13d, and for outputting rotational speed instruction values to the servo-controllers 18a to 18d for the respective servomotors which the respective servo-controllers control; and a bus 17a for connecting the servo-controllers 18a to 18d with the positioning controller 16a. Here, each mechanical unit corresponds to a robot manipulator having a certain motional degree of freedom ranging from 1 to 6. There are illustrated in FIG. 1 the mechanical units ①  to ⑤ each having the degree of freedom ranging from 5 to 1.

The system 10 further comprises: a teaching box 14a for providing operating conditions for each mechanical unit and for each servomotor via the positioning controller 16a; and a communication network 15 for connecting the teaching box 14a with the positioning controller 16a. The servo-controllers 18a to 18d receive pulse signals, each representative of rotation of a servomotor which the respective servo-controllers control, from pulse generators: 23a, 24a, 25a; 23b, 24b, 25b; 23c, 24c, 25c; and 23d, 24d, 25d attached to the servomotors 11a to 13d, respectively, and supply during currents to the respective servomotors.

A servo-controller can be added to the system 10, when the number of servomotors to be controlled by the system 10 exceeds an integer times m, and a positioning controller and a bus are added when the number of servo-controllers exceeds an integer times n. Further, the communication network 15 makes it possible to add one or more teaching boxes if necessary. In FIG. 1, there are illustrated an additional servo-controller 18n, because of the number of servomotors exceeding 3 times 4, and a positioning controller 16n' and a bus 17n', because of the number of servo-controllers exceeding 1 times 3. An additional teaching box 14n' also can be optionally provided.

Figure 2:
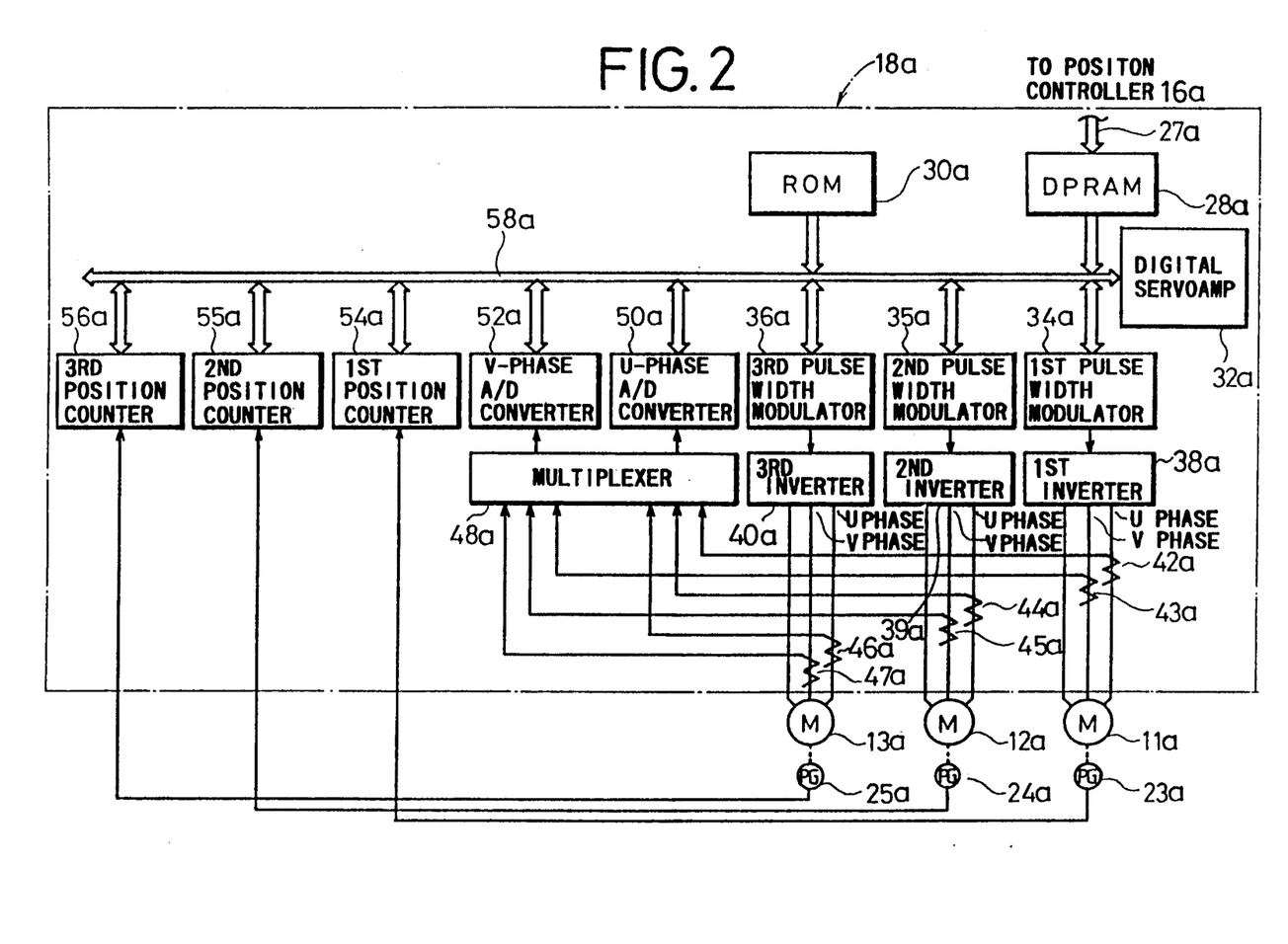
FIG. 2 is a block diagram showing an inner construction of the servo-controller shown in FIG. 1.

FIG. 2 is a block diagram showing an inner construction of one of the servo-controllers, 18a, included in the embodying system 10. The servo-controller 18a comprises: 3 pairs of current sensors: 42a, 43a; 44a, 45a; and 46a, 47a, for detecting 2 out of the 3 phases of the respective driving currents supplied to the servomotors 11a to 13a, a multiplexer 48a for selecting 1 out of the 3 pairs of the current sensors 42a to 47a, a pair of analog to digital converters 50a and 52a for converting a selected pair of analog signals outputted by the multiplexer into corresponding digital signals, and counters 54a, 55a and 56a for converting the pulse signals, supplied by the pulse generators 23a to 25a, into respective rotational positions of axes of the servomotors 11a to 13a.

The servo-controller 18a further comprises: a digital servo-amplifier 32a, or a digital signal processor (DSP), for performing speed and current control and for outputting driving signals for respective servomotors 11a to 13a; a common memory 28a; a read-only memory 30a; an inner bus 58a; PWM units 34a to 36a for converting the driving signals outputted by the digital servo-amplifier 32a to corresponding pulse-width modulated signals; and inverter circuits 38a to 40a for supplying three phase currents as the driving currents to the respective servomotors 11a to 13a based on the pulse-width modulated signals. The rotational positions are fed back to the positioning controller 16a via the common memory 28a, and at the same time, converted to the respective rotational speeds of the servomotors 11a to 13a in the digital servo-amplifier 32a.

Figure 3:
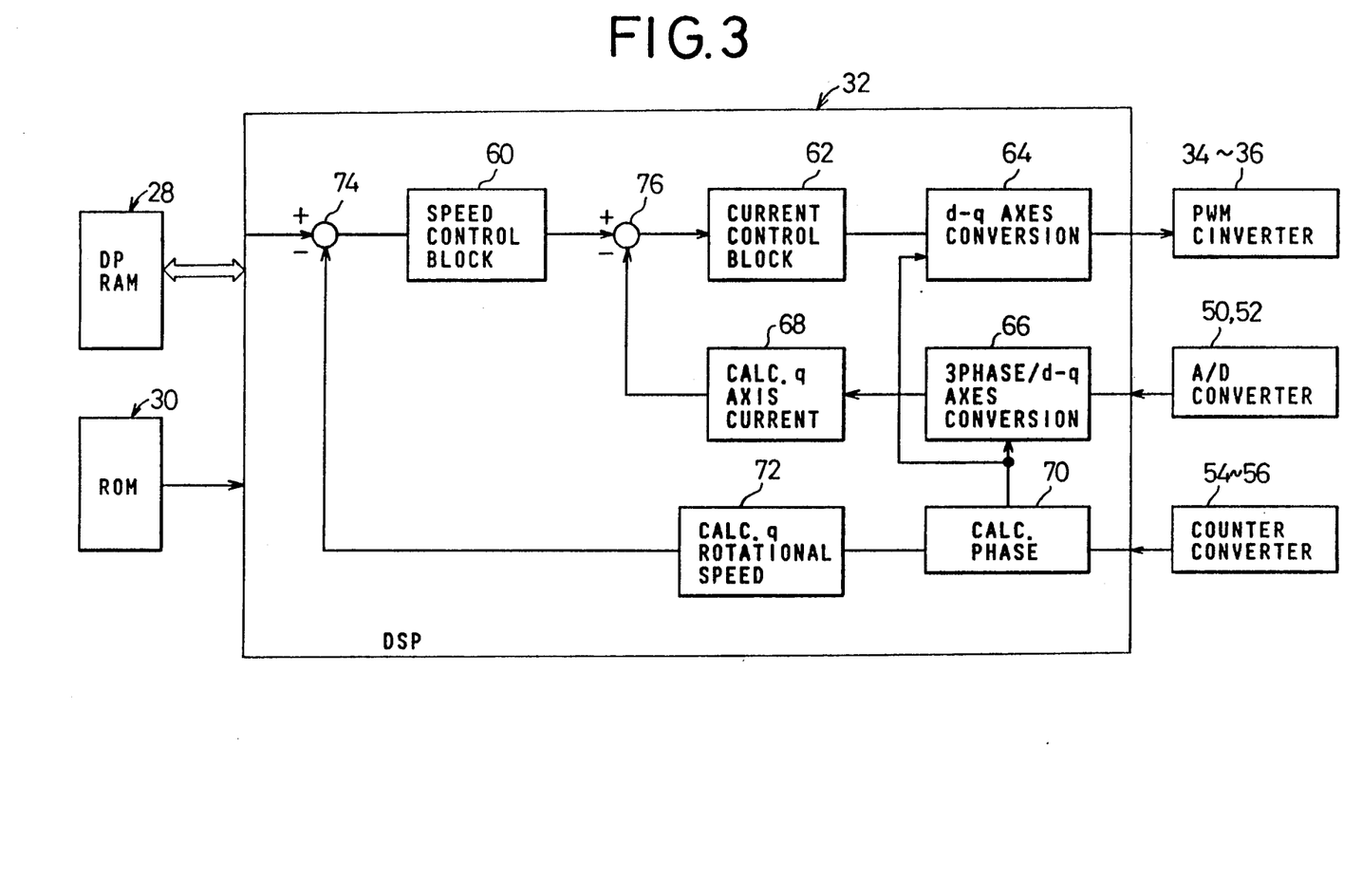
FIG. 3 is a block diagram showing an inner construction of the servo-amplifier including a DSP shown in FIG. 2.

FIG. 3 is a functional block diagram showing functions performed by the digital servo-amplifier 32a in a case where it controls a single servomotors. As shown by FIG. 3, the digital servo-amplifiers 32a includes: speed control program blocks for controlling the rotational speed of the servomotors 11a, 12a and 13a based on the respective rotational speed instruction values supplied by the positioning controller 16a via the common memory 28a; and current control program blocks for controlling the driving currents for the servomotors 11a, 12a and 13a based on respective driving current instruction values produced by the speed control program blocks. These control programs are programed on the DSP according to the "vector control theory" suitable for a precise control of AC servomotors. The digital servo-amplifier also runs self-diagnosis programs (not illustrated) to find out any over-load, over-speed or over-current during the operation of the servomotors 11a, 12a and 13a. The self-diagnosis data is transmitted, via the common memory 28a and positioning controller 16a, to the teaching box 14a for treatment and display. Other digital servo-amplifiers 32a to 32d have the same construction.

Figure 4:
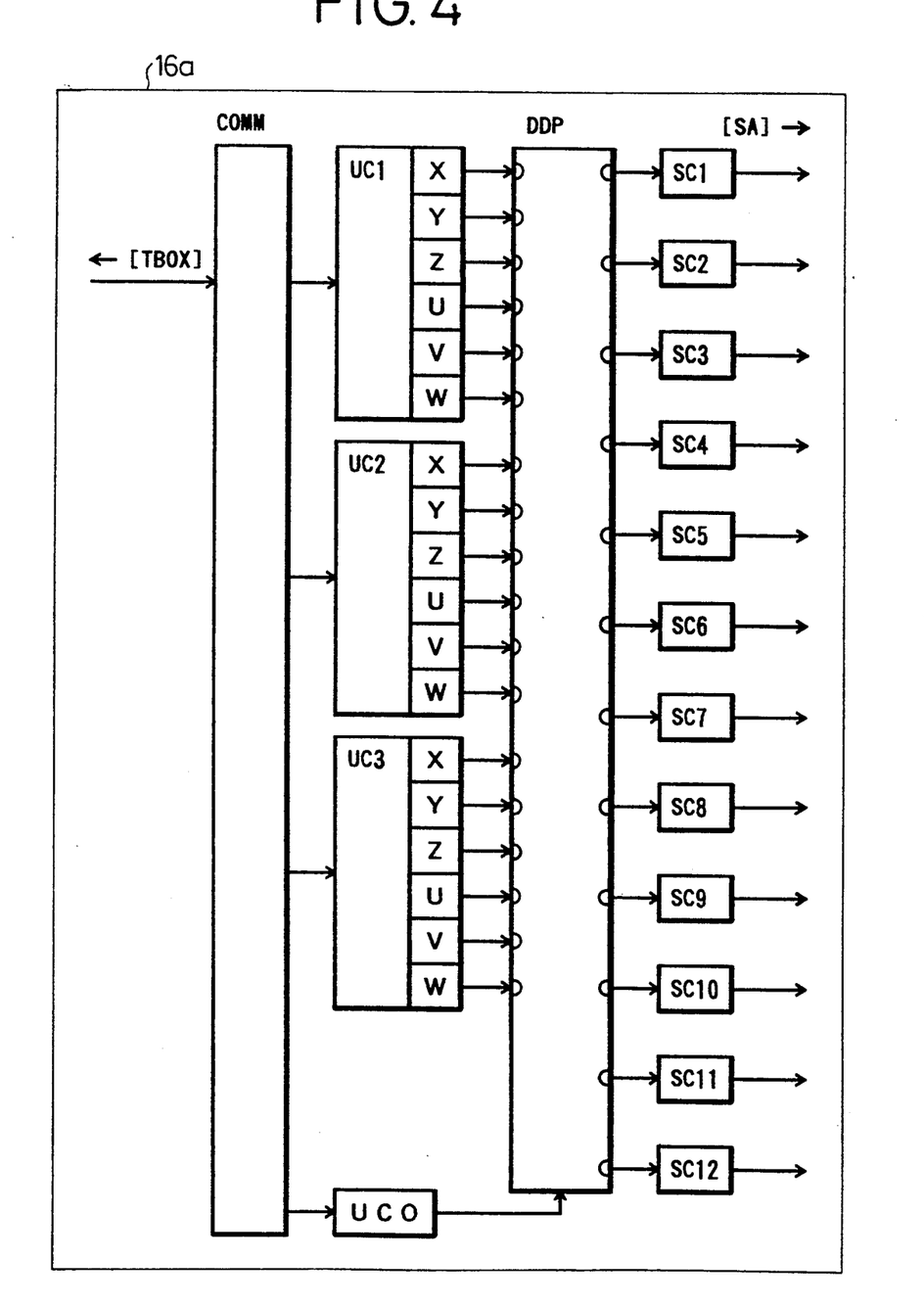
FIG. 4 is a block diagram showing an inner construction of the positioning controller shown in FIG. 1.

FIG. 4 is a functional block diagram showing functions performed by the positioning controller 16a. In FIG. 4, the positioning controller 16a includes: a communication control block COMM; unit control blocks UCi (i = 1, 2, . . , p) for controlling p mechanical units, where p is the number of mechanical units included in the system 10, each UCi including up to 6 logical axes; position control block SCj (j = 1, 2, . . . , mxn) for performing speed control for respective mxn servomotors; a connection block DDP for connecting mn position control blocks with p unit control blocks; and a supervisory block $UC_0$ for setting up respective unit control blocks UCi based on the mechanical unit information provided by the teaching box 14a.

Figure 6:
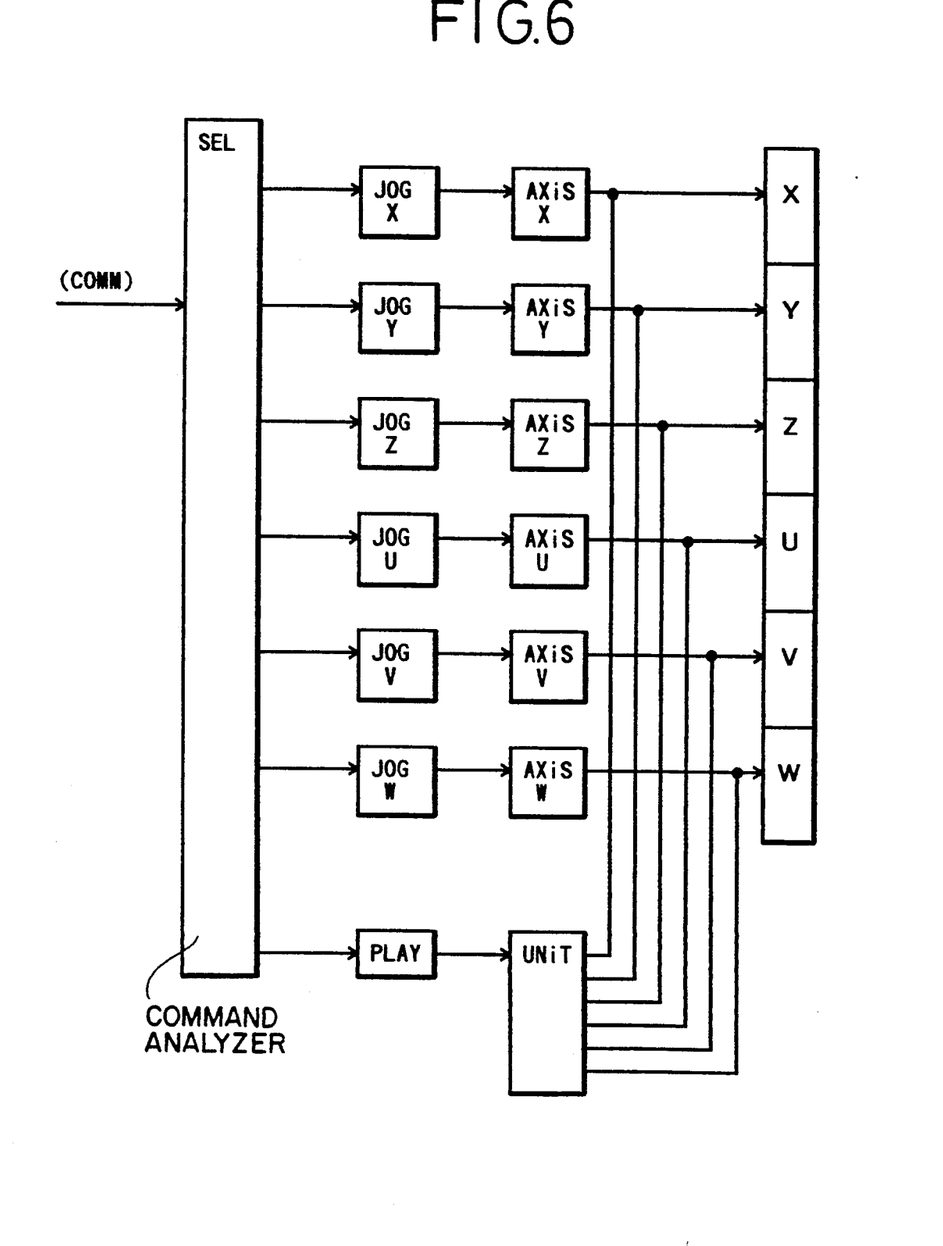
FIG. 6 is a block diagram showing an inner construction of the UC shown in FIG. 4.
Figure 7:
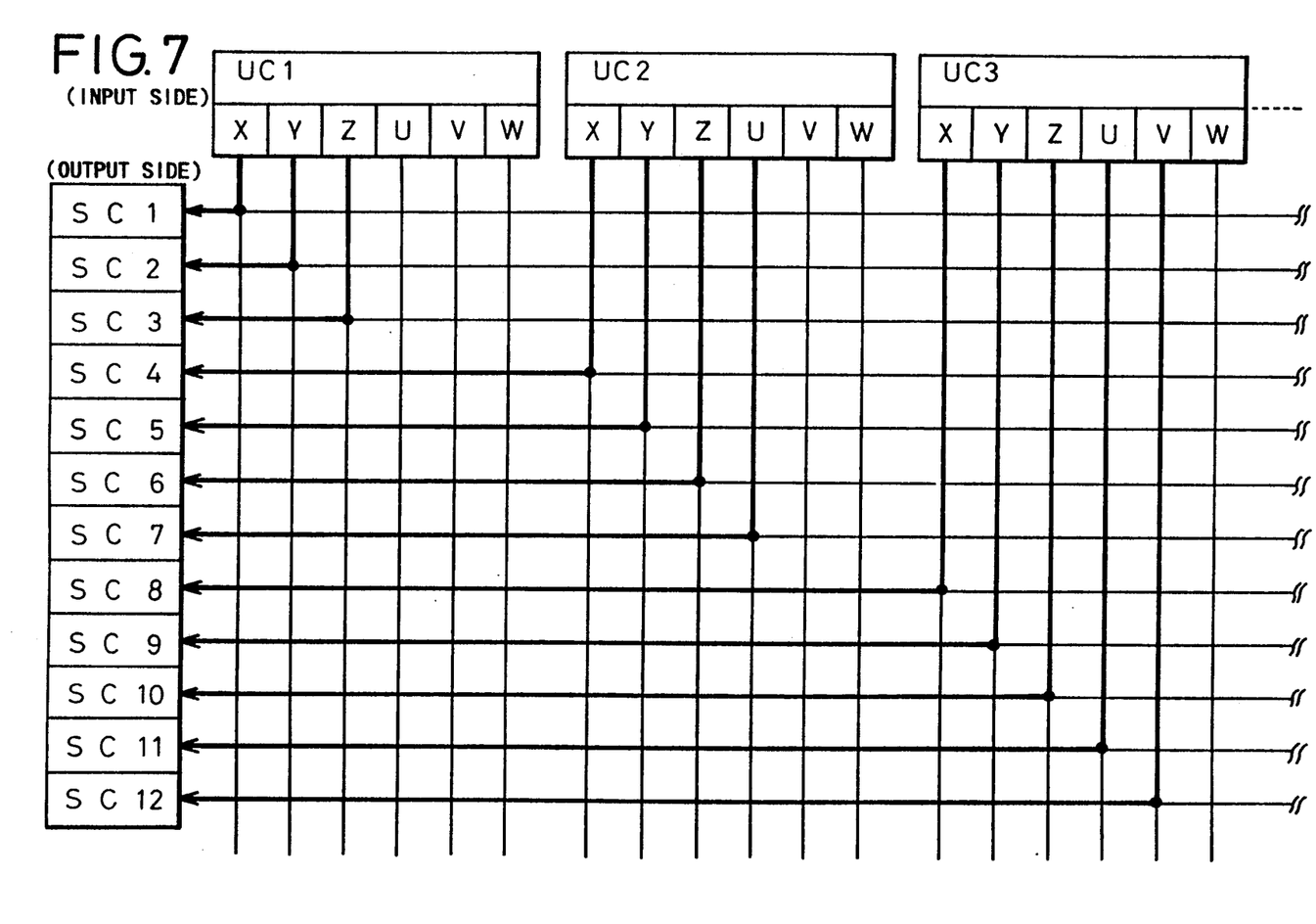
FIG. 7 is a block diagram showing an inner construction of the DDP shown in FIG. 5.
Figure 8:
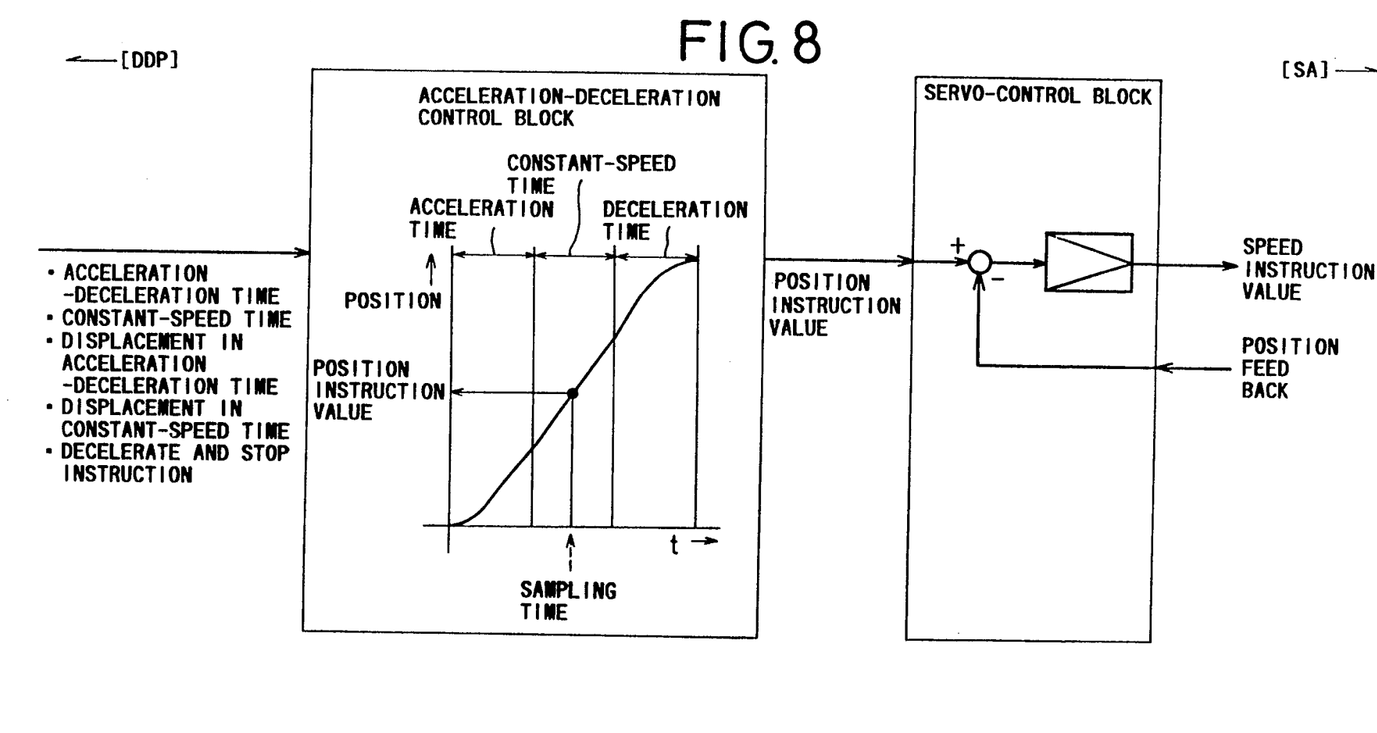
FIG. 8 is a block diagram showing an inner construction of the SC shown in FIG. 4.

Inner construction of the UC, DDP and SC are further illustrated by FIGS. 6, 7 and 8, respectively. Functions performed by the positioning controller 16a, specially those by the UCs, vary depending on the stages of operation that the system 10 is in: a setting stage; a teaching stage; and a play-back stage. Accordingly, explanation for FIGS. 6, 7 and 8 will be given in the course of explaining each stages of operations, with reference to other drawings, also.

Firstly, in the setting stage, the operator inputs to the positioning controller 16a, by use of a key-board (not shown) attached to the teaching box 14a, the mechanical unit information including: respective numbers of the servo-controllers and servomotors; output port numbers for the respective servomotors; rated constants of the respective servomotors, such as, rated horse-power, maximum speed and so on; and lists of servomotors constituting respective mechanical units.

Figure 5:
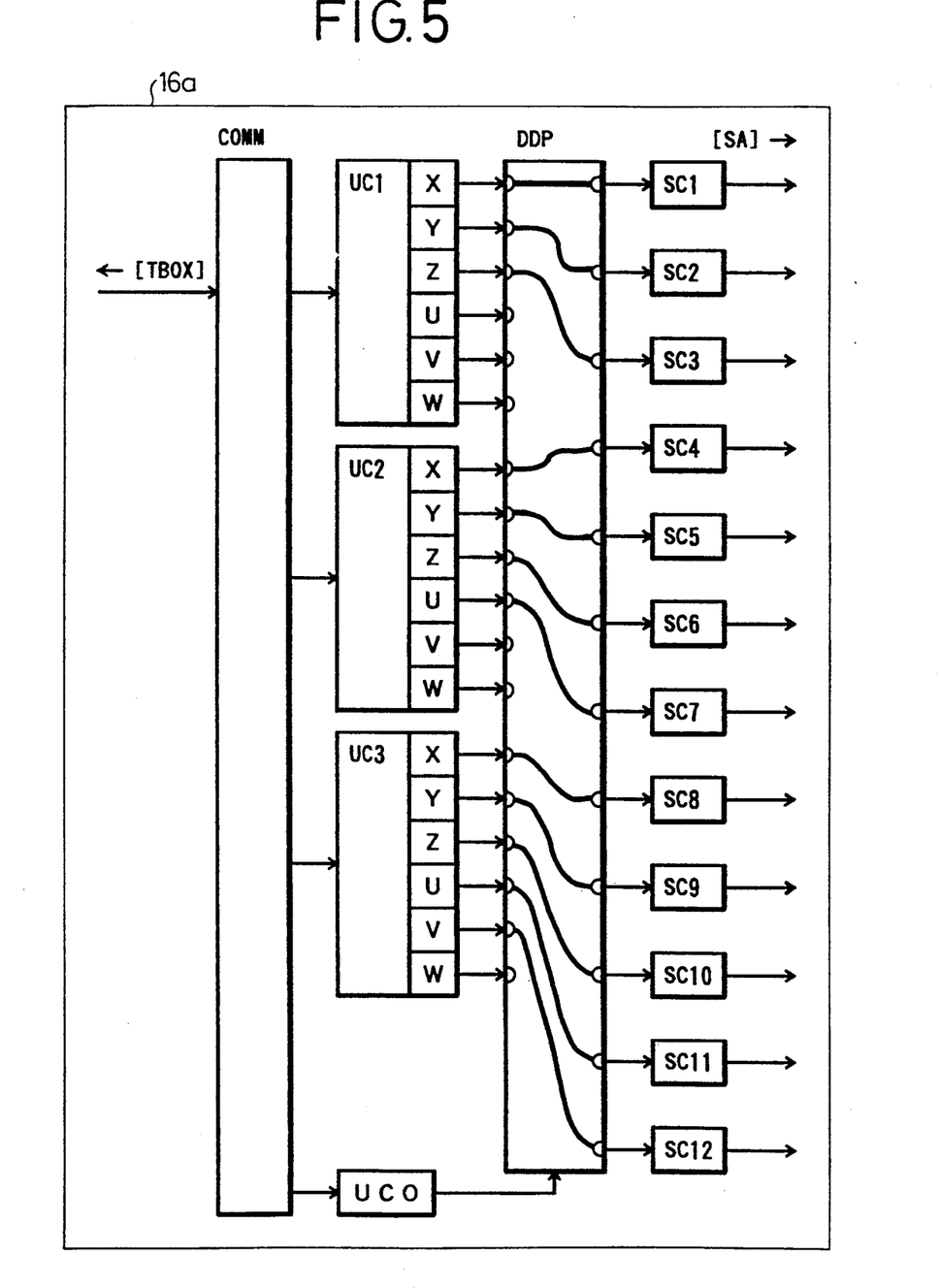
FIG. 5 is a same diagram as FIG. 4 except in which a component DDP has been wired.

The supervisory block $UC_0$ in the positioning controller 16 a assigns the servomotors to respective logical axes in each unit control block UCi. When the number of servomotors assigned in a UC is less than 6, remaining not-assigned logical axes are ignored. If no servomotor is assigned to a UC, the UC itself is ignored. At the same time, the $UC_0$ completes each connection in the DDP between a physical axis of a valid UCi and a corresponding position control block SCj, as illustrated in FIG. 5. The DDP is, actually, a software matrix or a table for connecting UCi and SCj, as illustrated in FIG. 7. The supervisory block $UC_0$ also provides control parameters for respective position control blocks SCj, and respective servo-controllers via the common memories.

In the teaching stage, each UCi performs teaching maned JOG operation. Namely, each UCi instructs each logical axis included therein to rotate in a desired direction and to stop at a desired position, based on commands given by the teaching box 14a. Data of the positions thus instructed to the axis in are stored a non-volatile memory. Data of one position is named a "step3[, and a set of steps is named a "pattern". Each UCi can produce multiple patterns and store them in the memory. Steps in a pattern are executed successively in the play-back stage.

Figure 9:
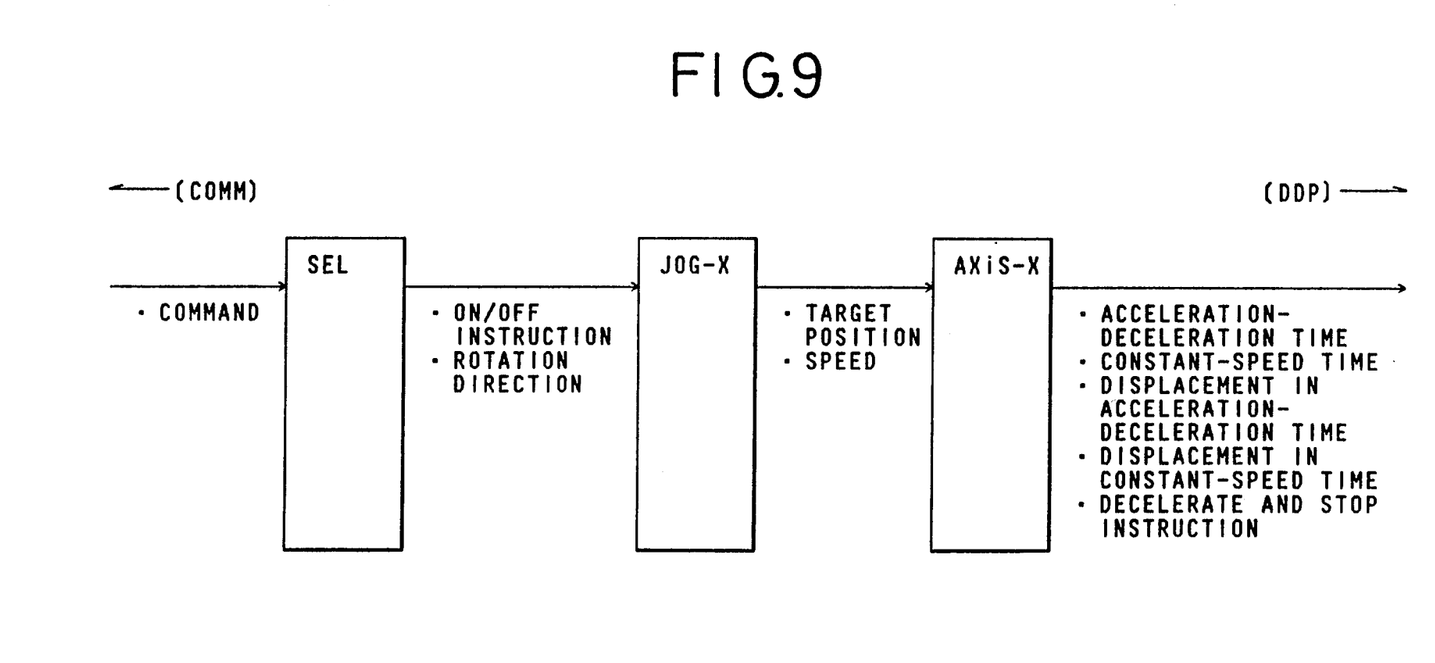
FIG. 9 is a schematic diagram for explanation of functions performed by the UC in the teaching stage.

FIG. 7 is a functional block diagram showing the inner construction of one of the unit control blocks UCs. Each UC includes: a command analyzer block SEL; JOG operation blocks or JOGs for respective axes; axis driving blocks or AXISs for respective axes; a play-back block PLAY; and a unit drive block UNIT. As shown in FIG. 9, inner blocks other than PLAY and UNIT are at work in the teaching stage.

A JOG-ON command issued by the teaching box 14a is transmitted to a designated UCi and analyzed by the SEL, which sends an instruction including an on/off timing and a rotational direction to the JOG-X, for instance. The JOG-X takes out a target position and rotational speed from parameters accompanying the instruction and transmits them to the AXIS-X. The AXIS-X, then, calculates from the target position and speed, an acceleration-deceleration time, a constant-speed time, a displacement in the acceleration-deceleration time and a displacement in the constant-speed time as start-up data required for a position control unit SCj assigned to the X-axis to start operations. The start-up data are sent to the DDP, which, as shown in FIG. 7, simply transfers the data to respective assigned position control blocks SCj, without any change. Above procedures are conducted in every UCi and for every valid ligical axis, Y, Z, . . . , W.

FIG. 8 is a functional block diagram for explaining operations performed by each position control block SCj. The SCj comprises an acceleration-deceleration control block and a servo-control block. The acceleration-deceleration control block receives the start-up data from the DDP and issues a position instruction value to the servo-control block, namely, acceleration, constant-speed and deceleration data are integrated by the acceleration-deceleration control block with respect to time in this order, and sampled to produce the position instruction value. The servo-control block performs position control to make a fed-back value of the rotational position of an axis coincide with the position instruction value and, as the result, produces a rotational speed instruction value, which is given to a designated speed control program block in the servo controllers 18a to 18d.

JOG-OFF command issued by the teaching box 14a to stop the motion of any axis is executed in the same manner as described above.

Figure 10:
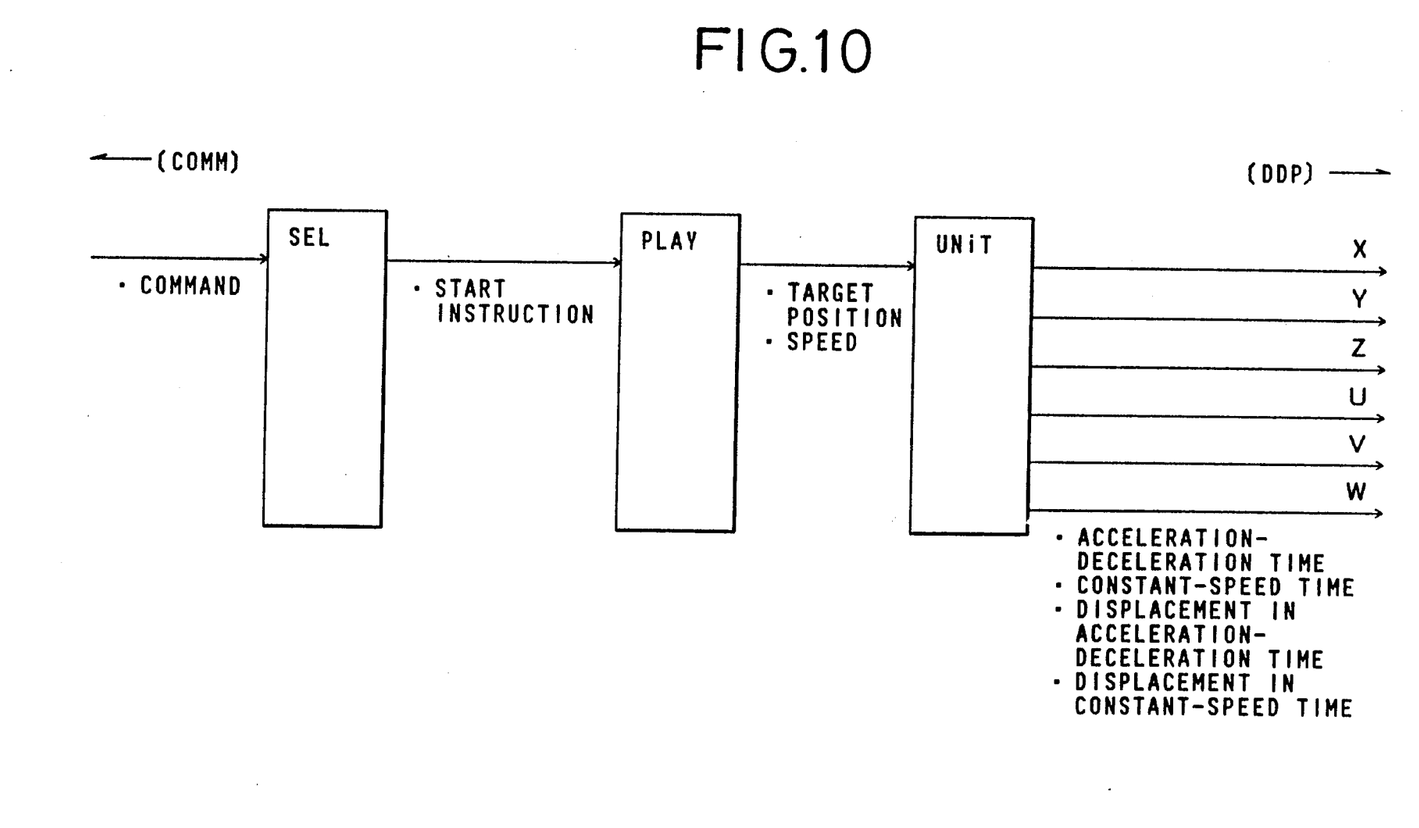
FIG. 10 is a schematic diagram for explanation of functions performed by the UC in the play-back stage.

In the play-back stage, the system 10 works on the configuration set up in the setting stage, and according to steps and patterns given in the teaching stage. In this stage, the inner construction and functions of the positional controller 16a are basically the same as illustrated in FIGS. 4 to 8. However, in each unit control block UCi, only the command analyzer block SEL, play-back block PLAY and unit drive block UNIT are at work, as shown in FIG. 10.

A play-back instruction is given by the teaching box 14a, which the communication control block COMM transmits to the designated UCi in the positional controller 16a. The SEL analyzes and play-back instruction and selects the PLAY to start its functions. The PLAY takes out from the memory the target values of position and speed, and transmits them to the UNIT. In order to realize a simultaneous arrival of axes, the UNIT calculates, in parallel for respective axes belonging to the mechanical unit, acceleration-deceleration time, constant-speed times, displacements in respective acceleration-deceleration times and displacements in respective constant-speed times as start-up data required for the corresponding position control block SCj to start operation. The start-up data are transferred to the SCj via the connection block DDP. The operations in DDP and thereafter are the same as those in the teaching stage.

Figure 11:
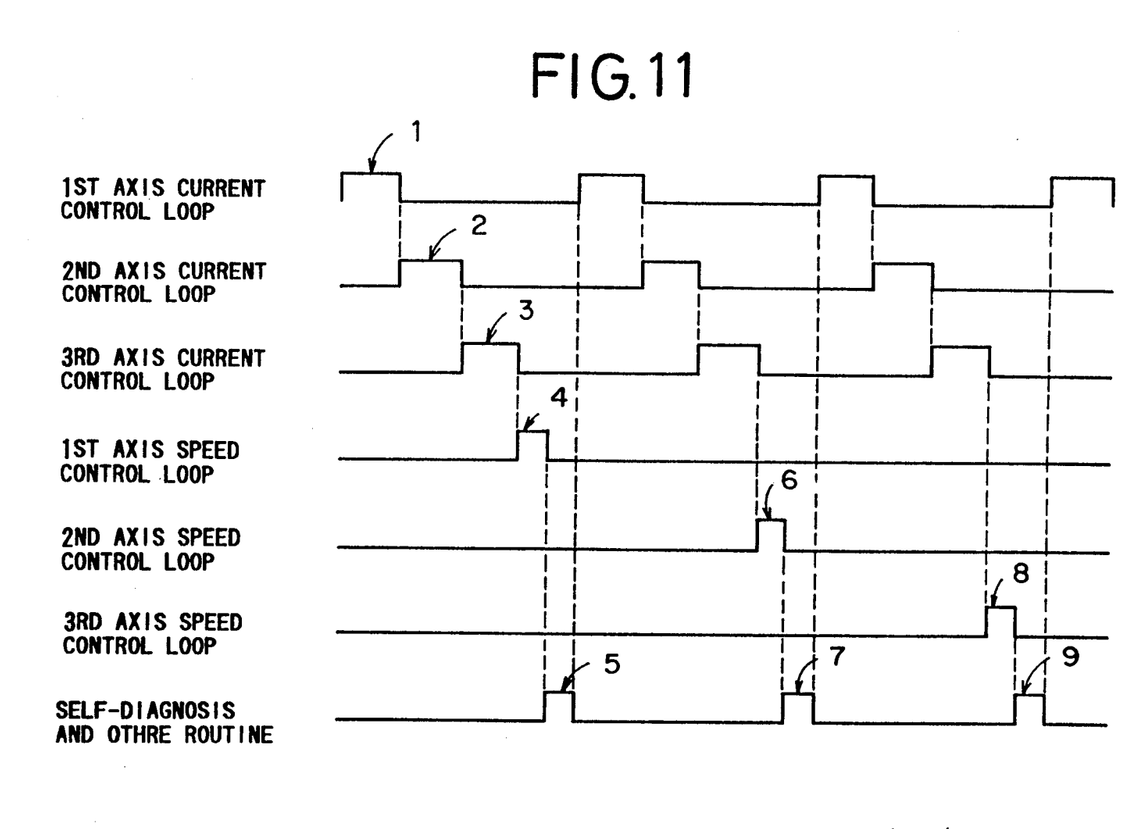
FIG. 11 is a timing chart showing the operation performed in the positioning controller shown in FIG. 4.

FIG. 11 is a timing chart illustrating the operations performed by the positioning controller 16a. The rotational position control for entire servomotors by the positioning controller 16a is conducted successively in one control cycle, and the results are transferred once in the cycle to the servo-controllers 18a to 18d via the bus 17a and common memories.

Figure 12:
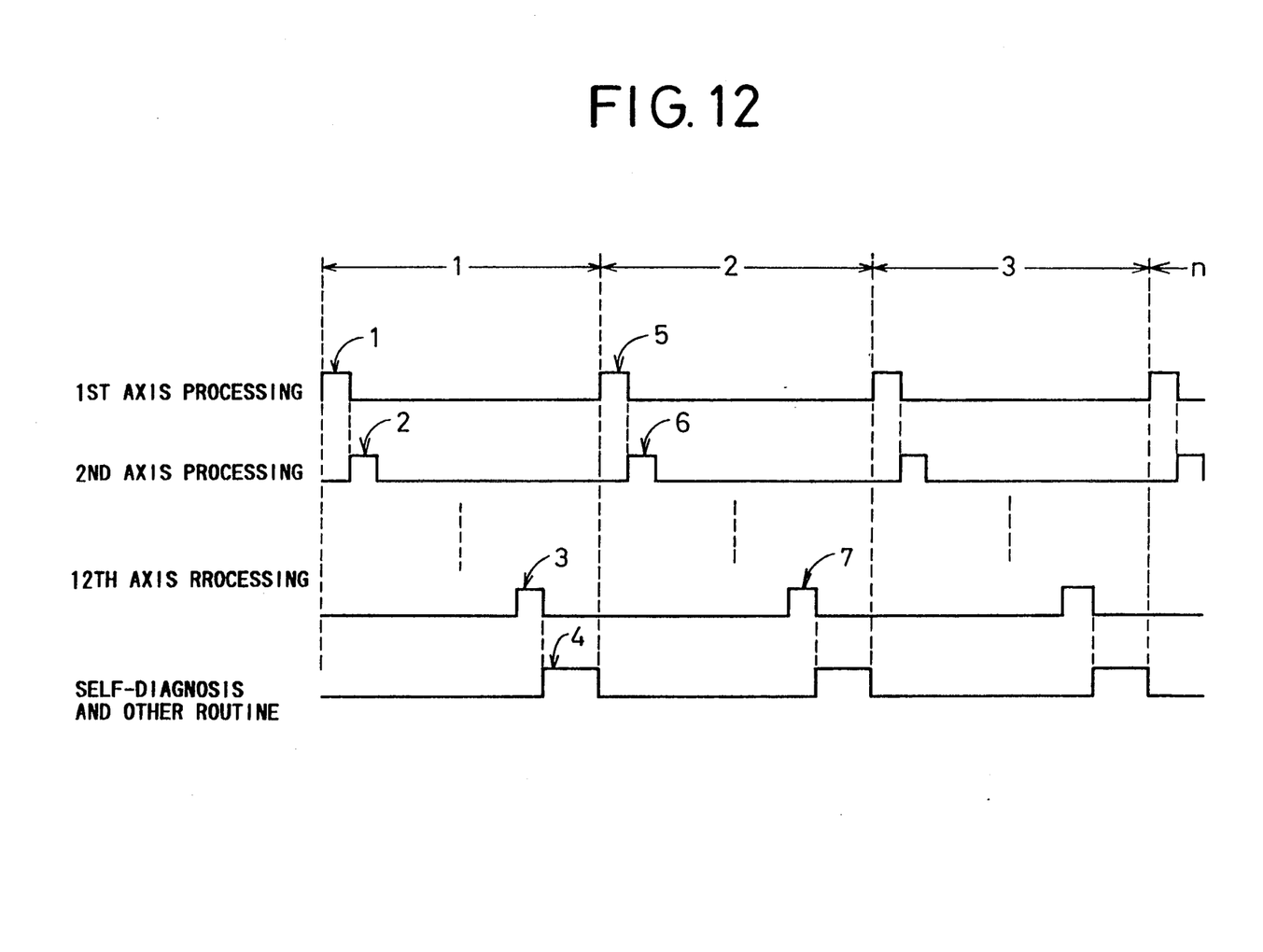
FIG. 12 is a timing chart showing the operation of controlling the servomotors performed in the servo-controller shown in FIG. 2.

FIG. 12 is a timing chart illustrating the operations performed by one of the servo-controllers 18a to 18d. The control of rotational speed and current for each servomotor by the servo-controller is conducted in such a manner that the speed control is conducted once for each servomotor every time the current control for entire servomotors has been conducted, and when the speed control has been conducted for entire servomotors, one control cycle is completed. The control by the servo-controllers 18a to 18d is conducted independently from that by the positioning controller 16a.

What is claimed is:

1. A servomotor control system for multi-axes, comprising:

at least one servo-controller which operates m speed control loops for m A.C. servomotors, each of said speed control loops including a current control loop, where m is a predetermined integer greater than unity;

at least one positioning controller which divides said servomotors into groups, each of said groups including at least one servomotor, each said positional controller operating a rotational position control loop under an acceleration-deceleration control for each of said servomotors, with interrelationship with each other said servomotor in said each group and independently of servomotors belonging to other groups, said rotational position control loop including a corresponding one of said speed control loops and providing a rotational speed instruction value to said speed control loop;

at least one bus for connecting said servo-controller with said positioning controller;

at least one teaching box for teaching said system operating conditions for each of said groups and each of servomotors therein; and a communication network for connecting said teaching box with said positioning controller, each said servo-controller including, position detecting means for detecting respective rotational positions of axes of said m servomotors, current detecting means for detecting respective driving currents supplied by said servo-controller to said m servomotors, a servo-amplifier calculating respective rotational speeds of axes of said m servomotors based on said respective rotational positions, for executing speed control operations to control said respective rotational speed instruction values supplied by said positioning controller, and for executing current control operations to control said respective driving currents to said m servomotors based on respective driving current instruction values produced in said speed control operations for said m servomotors, and driving current generating means for generating m three phase currents as said respective driving currents to be supplied to said m servomotors based on corresponding driving signals outputted by said servo-amplifier for said m servomotors, wherein a servo-controller can be added when the number of servomotors included in said system exceeds an integer greater than unity, a positioning controller and a bush can be added when the number of the servo-controllers exceeds an integer times n.

2. The system of claim 1, wherein said m is 3 and said n is 4.

3. The system of claim 1, wherein said servo-controller comprises:

position detecting means for detecting respective rotational positions of axes of said m servomotors;

current detecting means for detecting respective driving currents supplied by said servo-controller to said m servomotors;

a servo-amplifier for calculating respective rotational speeds of axes of said m servomotors based on said respective rotational positions, for executing speed control operations to control said respective rotational speeds of axes of said m servomotors based on respective rotational speed instruction values supplied by said positioning controller, and for executing current control operations to control said respective during currents to said m servomotors based on respective driving current instruction values produced in said speed control operations for said m servomotors;

driving current generating means for generating m three phase currents as said respective driving currents to be supplied to said m servomotors based on corresponding driving signals outputted by said servo-amplifier for said m servomotors.

4. The system of claim 1, wherein said servo-amplifier includes a digital signal processor (DSP).

5. The system of claim 1, wherein said servo-amplifier executes each of said speed control operations for each of said m servomotors after executing said current control operations for said m servomotors, and when said speed control operations are executed for m servomotors, one processing cycle in said servo-amplifier is completed.

6. The system of claim 3, wherein said current detecting means comprises: m pairs of current sensors for detecting two (2) out of three (3) phases of said respective driving currents for said m servomotors; a multiplexer for selecting one (1) out of said m pairs of current sensors; and a pair of analog-to-digital converters for converting a pair of analog signals provided by said multiplexer into corresponding digital signals.

7. The system of claim 3, wherein said driving current generating means comprises: m PWM, units for converting said respective driving signals outputted by said servo-amplifier for said m servomotors into corresponding pulse-width modulated signals; and m inverters for generating m three phase currents based on said corresponding pulse-width modulated signals.

8. The system of claim 1, wherein said positioning controller comprises unit control means for controlling said groups of servomotors by providing an acceleration-deceleration time, a constant-speed time, a displacement in the acceleration-deceleration time and a displacement in the constant-speed time for each servomotor of each group so that the entire servomotors of the group arrive at target positions simultaneously.

9. The system of claim 8, wherein said positioning controller further comprises position control means for controlling rotational positions of axes of said respective servomotors to coincide with the target positions supplied by said unit control means.

10. The system of claim 9, wherein said positioning controller further comprises connection means for connecting said unit control means with said position control means.

* * * * *